United States Patent
Howard, Jr.

[15] 3,671,509

[45] June 20, 1972

[54] COPOLYMERS OF FLUOROKETONE IMINES WITH POLYMERIZABLE UNSATURATED COMPOUNDS

[72] Inventor: Edward G. Howard, Jr., Hockessin, Del.

[73] Assignee: E. I. du Pont de Nemours and Company, Wilmington, Del.

[22] Filed: March 22, 1971

[21] Appl. No.: 126,923

Related U.S. Application Data

[63] Continuation-in-part of Ser. No. 748,660, July 30, 1968, abandoned.

[52] U.S. Cl.............................260/87.5, 117/132, 117/140, 117/148, 260/32.6, 260/32.8, 260/33.2, 260/33.6, 260/80.6, 260/85.5, 260/88.7, 260/89.1, 260/89.5, 260/9.11, 260/92.1, 260/92.8, 260/93.5, 260/94.9, 260/566

[51] Int. Cl..........................C08f 3/04, C08f 3/76, C08f 7/04

[58] Field of Search....................260/87.5, 88.7, 89.1, 91.1, 260/93.5, 94.9

[56] References Cited

UNITED STATES PATENTS 3,037,969  6/1962  Hankins et al.....................260/89.5 N
3,278,405  10/1966  Levine et al....................260/85.5 AM Primary Examiner—Harry Wong, Jr.
Attorney—James H. Ryan

[57] ABSTRACT

Copolymers of fluoroketone imines with one or more polymerizable olefinic compounds, e.g., a binary copolymer of hexafluoroacetone imine and ethylene or a terpolymer of N-methylhexafluoroacetone imine, ethylene and tetrafluoroethylene, useful as supported and unsupported films and as encapsulating agents, are prepared by reacting a fluoroketone imine with one or more polymerizable olefinic compounds.

25 Claims, No Drawings

COPOLYMERS OF FLUOROKETONE IMINES WITH POLYMERIZABLE UNSATURATED COMPOUNDS

RELATED APPLICATION

This application is a continuation-in-part of my copending application Ser. No. 748,660, filed July 30, 1968, and now abandoned.

BACKGROUND OF THE INVENTION

1. Field of the Invention

This invention relates to copolymers of fluoroketone imines with polymerizable unsaturated compounds.

2. Description of the Prior Art

So far as is known, there is no reference which discloses copolymers formed from fluoroketone imines and polymerizable unsaturated compounds. The following prior art references, however, are believed to be of interest in connection with the present invention:

1. In Can.J. Chem. 37, 1737 (1959), King and Steacie describe the photolysis of perfluoroacetonitrile. Among the products these workers characterized by mass spectroscopy was perfluoro-N-methylacetone imine. Formation of a polymer was observed in the course of this work, but the data showed that the polymer resulted from cyanogen, a major product of photolysis.

2. In J. Am. Chem. Soc. 82, 5831 (1960), Dresdner et al. reports preparation of $(CF_3)_2C=NF$ but does not disclose polymerization of this compound.

3. U.S. Pat. No. 3,226,439, to Middleton, shows hexafluoroacetopropylidene imine and certain other fluorine-containing imines but does not disclose polymerization of these compounds.

4. In J. Am. Chem. Soc. 89, 1422 (1967), Howard, Krespan and Sargeant review the free radical chemistry of fluoroketones but do not disclose polymerization of fluoroketone imines.

5. U.S. Pat. No. 3,342,777 to Howard, entitled "Copolymers of Fluoroketones with Ethylenically Unsaturated Compounds", describes copolymers of fluoroketones, the ketone analogs of the fluoroketone imines employed in the present invention.

SUMMARY AND DETAILS OF THE INVENTION

The copolymers of the present invention are film-forming, random binary copolymers, terpolymers or other polynary compounds of nonhomopolymerizable fluoroketone imines and one or more polymerizable olefinic compounds. Formed by direct interaction of the precursors, they may be represented by the structure

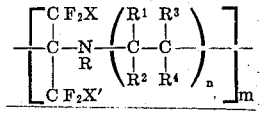

wherein X and X', which may be the same or different, are hydrogen, chlorine, fluorine or fluoroalkyl of up to three carbon atoms; R is hydrogen, hydrocarbyl, halohydrocarbyl, carbacyl or halohydrocarbacyl of up to ten carbon atoms; $R^1$, $R^2$, $R^3$ and $R^4$, which may be the same or different, are hydrogen, halogen, hydrocarbyl, including alkyl and aryl, cyano, alkoxy, acyl, alkoxycarbonyl or acyloxy, the number of carbon atoms in any of $R^1$ through $R^4$ being in the range of one to ten and preferably in the range of one through six and the total number of carbon atoms in $R^1$ through $R^4$ inclusive being in the range 0 through 20; n is an integer in the range 1 through 130 and m is greater than 4. Preferably, X and X' are fluorine or chlorine and the previously mentioned hydrocarbyl, halohydrocarbyl, carbacyl and halohydrocarbacyl groups contain up to eight carbon atoms.

It will be understood that, when more than one polymerizable unsaturated compound are used as precursors, the various moieties, or units, within the parentheses, derivative from the different olefinic precursors, need not be the same.

In like manner, two or more different imine precursors can be used to prepare one polymer. In the latter case, different recurring imine groups (groups within the brackets but not within the parentheses) are formed. Since the imines do not homopolymerize, the imine units are, however, connected through olefinic units.

The present random copolymers are prepared by reaction of a fluoroketone imine having the structure

wherein X, X' and R are as previously defined with at least one polymerizable olefinic compound having the structure

wherein $R^1$, $R^2$, $R^3$ and $R^4$ are as previously defined. Generally, at least two of the groups $R^1$, $R^2$, $R^3$ and $R^4$ are hydrogen. Any polymerizable olefinic compound used, therefore, is, generally, a vinyl, vinylene, or vinylidene compound. Preferably, three of four of the groups $R^1$, $R^2$, $R^3$ and $R^4$ are hydrogen. Thus, the preferred comonomers are vinyl compounds including ethylene.

The copolymers of the present invention may be prepared by contacting and reacting — mixing — at least one fluoroketone imine with one or more of the polymerizable olefinic compound previously described in the presence of a free radical-producing initiator. Any compound that generates free radicals under the conditions at which the reaction is run can be used as an initiator. Preferred classes of such free-radical sources are peroxy compounds and azonitriles.

Suitable peroxy compounds are dibenzoyl, dilauroyl, dimethyl, diethyl, di-t-butyl, dioctadecyl, disuccinoyl, perfluoromethyl, perfluoropropionyl and urea peroxides, t-butylperoxy valerate, peracetic and perbenzoic acids, alkyl dialkylboron oxides and alkali metal persulfates, perbenzoates and percarbonates. These compounds may be used alone or in combination with a reducing agent.

Suitable azonitriles include 1,1'-azobis(cyclohexane-carbonitrile), α,α'-azobis(cyclopropanecarbonitrile), α,α'-azobis-(isobutyronitrile), α,α'-azobis(α,γ-dimethyl-valeronitrile), α,α'-azobis(α-methyleneanthronitrile), α,α'-azobis(α-phenyl-propionitrile), α,α'-azobis(α-cyclohexyl-propionitrile), α,α'-azobis(α-methyl-γ-carboxybutyronitrile and its sodium salts, disodium α,α'-azobis(γ-cyanovalerate) and 1,1'-azobis(camphane carbonitrile).

The amount of copolymerization initiator to be used in the practice of this invention is dependent on the monomers used and the choice of other variables. Generally the weight of the initiator amounts to at least 0.001 percent by weight of the combined monomers, and usually 0.01 to 1 weight percent of initiator is employed to obtain a reasonable reaction rate. A weight of initiator greater than 10 percent of the monomer weight is usually of no advantage; 10 percent initiator by weight may therefore be considered a noncritical though practical upper limit.

The temperature to be employed for the copolymerization is somewhat dependent on the choice of the free radical generator and may vary broadly from −80° C. to as high as 250° C., depending on the temperature at which the selected initiator cleaves to form free radicals. Usually temperatures in the range of 40° C. to 175° C. are preferred as giving good yields of copolymer and reasonable reaction rates.

Elevated pressure is generally requisite only for copolymerization of such normally gaseous olefinic compounds as ethylene, vinyl chloride, vinyl fluoride, vinylidene fluoride, tetrafluoroethylene, and the like. When copolymerizing olefinic compounds of this type, it is usual to charge a pressure-resistant reactor with the fluoroketone imine, initiator, and solvent, if used. The reactor is closed and injected with the gaseous olefinic material at the selected temperature and pressure conditions. The copolymerization is continued for the desired length of time during which a constant temperature is maintained and the pressure is controlled by periodic injections of the olefinic material. For this mode of operation pressures of about 10–600 atmospheres are usually satisfactory and are preferred, though pressures of up to 1000 atmospheres may be employed. The course of the copolymerization by this procedure can readily be followed by observance of the pressure drop of the gaseous reactant.

Normally liquid or solid olefinic comonomers are generally charged into a reactor along with the fluoroketone imine, solvent, if used, initiator and, if desired, a third polymerizable compound. This charging operation may be carried out in an inert atmosphere such as a nitrogen or helium filled glove box. Alternatively, it may be more convenient to charge all the reaction components into the reactor in air. Removal of the air by evacuation may then be effected after cooling of the reactants when necessary to retain volatile material. Particularly sensitive compounds may be frozen and evacuated to degas the reaction components completely and to remove all adsorbed material that might inhibit the copolymerization reaction. Reactions carried out in this manner may be run at subatmospheric pressure, the pressure in the sealed reactor being the vapor pressure of the reactants at the chosen temperature of operation.

The ratio of fluoroketone imine(s) to polymerizable unsaturated compound(s) may vary widely depending on the properties sought for the copolymer and the reactivities of the monomers employed. Broadly, proportions may range from 1 to 99 percent by weight of fluoroketone imine. Extremes of concentration may result in little differentiation from homopolymers, and it is preferred to employ from about 5 to 90 percent of the fluoroketone imine, the higher proportions of fluoroketone imine being used when the reactivity coefficients are such that the comonomer polymerizes faster than the fluoroketone imine.

As shown in the following examples, solvents are not necessary for the practice of this invention, but it is often desirable to modify otherwise vigorous reactions by dilution or to dissolve solid reactants. In these cases a solvent may be employed. Suitable solvents include benzene, 2,2,4-trimethylpentane, 2,2,3,3-tetramethylbutane, and preferably fluorocarbons such as dichlorotetrafluoroethylene, 1,1,2-trichloro-1,2,2-trifluoroethane, dichlorodifluoromethane, α,α-bis(perfluoromethyl)benzylacohol, perfluoro-2-butyltetrahydrofuran and hexafluoroisopropanol. Other solvents that can be used include carbon disulfide, acetonitrile, diethyl ether, methanol and perfluoropropyl acetate.

The reactors used in the copolymerizations of this invention may be constructed of various materials. The primary requisites of such materials are adequate strength to withstand the elevated pressures that may be employed, corrosion resistance and absence of catalytic effect toward side reactions. Suitable vessels are fabricated of or lined with stainless steel, the Hastelloys, Monel, silver, platinum, Pyrex glass and other resistant glasses.

EMBODIMENTS OF THE INVENTION

There follow some nonlimiting Examples illustrative of the present invention.

EXAMPLE 1

Copolymerization of Hexafluoroacetone Imine and Ethylene

A pressure vessel was charged with 100 ml. of benzene, 150 mg. of di-t-butyl peroxide and 10 g. of hexafluoroacetone imine, prepared according to Examples 1 and 2 of U.S. Pat. No. 3,226,439. The polymerization was carried out with shaking at 135° C. for 3.5 hours under a pressure of 600 atm. of ethylene. The solid copolymer (9.5 g.) was collected by filtration, washed with benzene, recrystallized from benzene and dried at 100° C./0.1 mm. for 5 hours. The polymer was pressed at 120° C. to a flexible film.

Analysis: 15.15% F, 1.18% N, corresponding to a mole ratio of hexafluoroacetone imine to ethylene of 1:21 based on F analysis.

The filtrate from the above procedure was concentrated by vacuum evaporation to give 15 g. of pale yellow waxy solid.

Analysis: 28.3% F, 2.5% N, corresponding to a mole ratio of hexafluoroacetone imine to ethylene of 1:8.4 based on F analysis.

EXAMPLE 2

Copolymerization of N-acetylhexafluoroacetone Imine and Vinyl Acetate

A Pyrex polymer tube was charged with 50 mg. of

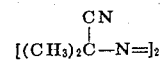

5 ml. of vinyl acetate and 1.3 g. of $(CF_3)_2C=NCOCH_3$ prepared by the method of Middleton and Krespan, J. Org. Chem. 30 1398 (1965). After being cooled in a dry ice/acetone bath, the tube was evacuated. The vacuum source was cut off and the tube was warmed to room temperature, recooled, evacuated and sealed. The polymerization was carried out at 50° C. for 17 hours. The viscous solution was poured into pentane to precipitate the copolymer. After washing with fresh pentane and drying at 100° C./0.5 mm., the copolymer weighed 4 g.

Analysis: 18.2% F. which corresponds to a mole ratio of N-acetylhexafluoroacetone imine to vinyl acetate of 1:6.

EXAMPLE 3

Copolymerization of N-acetylhexafluoroacetone Imine and Acrylonitrile

This experiment was carried out as in Example 2 except for substitution of 5 ml. of acrylonitrile as the comonomer. The crude copolymer was washed with ether and dried at 100° C./0.5 mm., its weight being 3 g.

Analysis: 1.9% F, which corresponds to a mole ratio of N-acetylhexafluoroacetone imine to acrylonitrile of 1:108.

EXAMPLE 4

Copolymerization of N-acetylhexafluoroacetone Imine and Styrene

This experiment was carried out as in Example 2 except for substitution of 2 ml. of styrene as comonomer. The reaction mixture consisted of two layers, and the product was isolated by precipitation with methanol. The precipitated solid copolymer (0.8 g.) was dried at 100° C./0.5 mm.

Analysis: 5.3% F, which corresponds to a mole ratio of N-acetylhexafluoroacetone imine to styrene of 1:18.8.

EXAMPLE 5

Copolymerization of Hexafluoroacetone Imine and Styrene

A. A Pyrex polymer tube was charged with 6.5 mg. (0.05 mole percent based on monomers used) of azobisisobutyronitrile, 6.2 g. (0.06 mole) of distilled styrene and 3.3 g. (0.02 mole) of hexafluoroacetone imine, prepared according to the method of U.S. Pat. No. 3,226,439.

The reaction charge was frozen and degassed, and the tube was sealed. The mixture was heated at 65° C. for 15 hours. The polymer was precipitated by adding the reaction mixture to methanol, and the solid was dried at 100° C./0.3 mm., its weight being 1.2 g.

Analysis: 14.3% F, which corresponds to a mole ratio of hexafluoroacetone imine to styrene of 1:6.1.

B. The procedure of Example 5 A was followed with 7.1 g. (0.07 mole) of styrene, 1.7 g. (0.01 mole) of hexafluoroacetone imine and 3.9 mg. of azobisisobutyronitrile. Reaction was carried out at 70° C. for 6 hours. This procedure yielded 0.6 g. of copolymer.

Analysis: 10.4% F, which corresponds to a mole ratio of hexafluoroacetone imine to styrene of 1:8.9.

EXAMPLE 6

Copolymerization of N-hexafluoroisobutyrylhexafluoroacetone Imine with Vinyl Acetate, Styrene and Acrylonitrile, Separately This series of reactions was carried out in Pyrex polymer tubes, each containing 10 mg. of $\alpha,\alpha'$-azobisisobutyro-nitrile catalyst added as a 1 percent benzene solution and 1 g. of $(CF_3)_2CNCOCH(CF_3)_2$ as the fluoroalkyl ketone imine. Each tube containing the above mixture was attached with butyl rubber tubing to a vacuum train, cooled with dry ice/acetone and evacuated. The pressure in the vacuum train was raised to 1 atm. by addition of dry nitrogen, and the various comonomers were added to each tube by injection from a hypodermic syringe through the rubber tubing wall. The mixtures in the tubes were evacuated again and the tubes were sealed. The polymerizations were carried out at 70°–75° C. for 4 hours.

A. 5 ml. of vinyl acetate was used as the comonomer in Tube 1. The copolymer was isolated by solution in benzene and precipitation with petroleum ether. The dried copolymer weighed 3.8 g.

Analysis: 2.2% F, inherent viscosity in benzene at 25° C., 1.45. This analysis corresponds to a N-hexafluoroisobutyryl-hexafluoroacetone imine to vinyl acetate mole ratio of 1:120.

B. 5 ml. of styrene was used as the comonomer in Tube 2. The copolymer was isolated by solution in benzene and precipitation with methanol. The dried copolymer weighed 2.1 g.

Analysis: 2.8% F, inherent viscosity in benzene at 25° C., 0.37. This analysis corresponds to a mole ratio of N-hexafluoroisobutyryl hexafluoroacetone imine to styrene of 1:87.5.

C. 5 ml. of acrylonitrile was used as the comonomer in Tube 3. This reaction yielded 4.0 g. of copolymer. One gram of the dry copolymer was dissolved in dimethylformamide and precipitated in methanol. The weight of this dried copolymer was 0.5 g.

Analysis: 6.3% F, which corresponds to a mole ratio of 1:61.5.

The preparation of N-hexafluoroisobutyrylhexafluoroacetone imine, used in this Example and in Example 7 which follows, was carried out according to the scheme

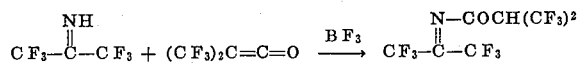

A mixture of 33 g. (0.2 mole) of hexafluoroisopropylidenimine, 36 g. (0.2 mole) of bis(trifluoromethyl)-ketene and about 2 g. of boron trifluoride was sealed in a Carius tube, and the tube was heated at 100° C. in a steam bath for 3 hours. The tube was cooled and opened, and the solid contents were melted and poured out. Distillation gave 41.3 g. of N-(3,3,3-trifluoro-2-trifluoromethylpropionyl)hexafluoroisopropylidenimine [i.e., N-hexafluoroisobutyrylhexafluoroacetone imine] as a very reactive, colorless white solid, b.p. 102°–104° C., m.p. 45°–47° C. Higher boiling materials were not identified. The infrared spectrum of a $CCl_4$ solution had absorption at 5.67$\mu$. The $F^{19}$ nmr spectrum in acetone showed a doublet (J = 8) at 64.6 ppm and a singlet at 80.7 ppm of equal area. The $H^1$ nmr spectrum in $(CD_3)_2CO$ showed a septet (J = 8) at $\tau$5.02.

Anal. Calcd. for $C_7HF_{12}NO$:
  C, 24.5; H, 0.3; F, 66.5; N, 4.1
Found: C, 24.7; H, 0.6; F, 66.5; N, 4.2.

EXAMPLE 7

Copolymerization of N-hexafluoroisobutyrylhexafluoroacetone Imine and Acrylonitrile A Pyrex polymer tube was charged with 10 mg. of azobisisobutyronitrile and evacuated for 10 minutes to dry the reactor and catalyst. The pressure was brought to atmospheric pressure with nitrogen, and the tube was charged with 7.9 g. (0.02 mole) of N-hexafluoroisobutyrylhexafluoroacetone imine, $(CF_3)_2C=NCOCH(CF_3)_2$. The tube was connected to a vacuum train, cooled with a dry ice/acetone bath and evacuated. The tube was pinched off and 1.1 g. (0.22 mole) of inhibitor-free acrylonitrile was added by injection with a hypodermic syringe through the rubber tubing into the reactor. After evacuation the glass tube was sealed. The mixture was heated at 58° C. for 4 hours. The resulting copolymer was dissolved in ether and filtered. The polymer was precipitated with petroleum ether and dried at 120° C. under 0.5 mm. pressure. The weight of the dried copolymer was 4.5 g.

Anal. Calcd. for copolymer of mole ratio 1:1 :
  N, 7.1%; F, 57.7%
Found: N, 7.8%; F, 55.5%.

The inherent viscosity was 0.47 in acetone at 25° C.

A clear film was pressed at 160° C. It was easily oriented by drawing when heated above a flame.

EXAMPLE 8

Copolymerization of N-Benzoylhexafluoroacetone Imine with Acrylonitrile and Styrene, Separately The experiments of Example 8 were carried out in a manner similar to those of Example 6. Each reaction tube was charged with 2 mg. of azobisisobutyronitrile and 2.7 g. (0.01 mole) of N-benzoylhexafluoroacetone imine, $(CF_3)_2C=NCOC_6H_5$, in addition to the various comonomers. The N-benzoylhexafluoroacetone imine used was prepared by the method of Zeifman, Gunbaryan and Knunyants, Isv. Akad. Nauk. S.S.S.R., Soc. Khim. 1965, 2046. After degassing and sealing, the tubes were heated at 75°–85° C. for 4 hours.

A. The first tube was charged with 1.1 g. (0.02 mole) of acrylonitrile as comonomer. The copolymer formed was suspended in ether, filtered and dried at 150° C./0.2 mm. The dry weight of the copolymer was 0.9 g.

Analysis: 2.6% F, which corresponds to a mole ratio of N-benzoylhexafluoroacetone imine to acrylonitrile of 1:75.

B. The second tube was charged with 2.1 g. (0.02 mole) of styrene as comonomer. The copolymer formed was isolated by pouring the mixture into methanol and filtering. The solid was dried at 150° C./0.3 mm. The dry weight of copolymer was 0.2 g.

Analysis: 2.6% F, which corresponds to a mole ratio of N-benzoylhexafluoroacetone imine to styrene of 1:39.5.

EXAMPLE 9

Copolymerization of Pentafluoroacetone Imine and Acrylonitrile

The procedure of Example 6 was followed with 10 mg. of azobisisobutyronitrile, 1.5 g. of pentafluoroacetone imine and 0.5 g. of acrylonitrile. Copolymerization was carried out at 58° C. for 3 hours. The yield of dry copolymer was 0.3 g. Analysis: 1.9% F, which corresponds to a ketone imine to acrylonitrile mole ratio of 1:90.

The preparation of 1,1,1,3,3-pentafluoro-isopropylidenimine (pentafluoroacetone imine) used in this experiment was carried out according to the scheme

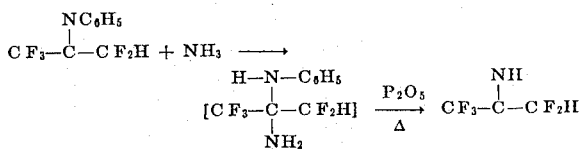

Twenty-three ml. of ammonia at −78° C. (ca. 1.1 mole) was bubbled into 81 g. (0.36 mole) of N-phenylpentafluoroisopropylidenimine contained in a flask cooled by an ice bath and connected to a dry ice/acetone condenser. This solution was refluxed for 1 hour and stirred at room temperature overnight. The solution was mixed with 100 g. of phosphorus pentoxide in a flask connected to a simple still. This mixture was then heated strongly to distill. The products were redistilled to give 22.3 g. (42 percent) of pentafluoroisopropylidenimine boiling at 42° C.

The $H^1$ nmr showed a singlet at $\tau$−1.15, triplets (J = 55) at $\tau$4.30 and (J = 52) at $\tau$2.75, and a singlet at $\tau$8.01 indicating some impurity. The $F^{19}$ nmr showed triplets (J = 5) centered at 71.1 ppm and (J = 5) at 74.6 ppm, a doublet (J = 52) split to multiplets centered at 137.5 ppm, a doublet (J = 53) split to quartets (J = 9) to doublets (J =2.0) centered at 135.4 ppm, and a doublet (J = 52) split to multiplets at 107.0 ppm (this latter set of peaks indicating impurity).

Anal. Calcd. for $C_3H_2F_5N$:
C, 24.5; H, 1.4; F, 64.6; N 9.5
Found: H, 1.9; F, 64.7; N, 9.4.

EXAMPLE 10

Copolymerization of N-phenylpentafluoroacetone Imine and Acrylonitrile

The procedure of Example 6 was followed with 10 mg. of azobisisobutyronitrile, 1.1 g. of N-phenylpentafluoroacetone imine and 1.1 g. of acrylonitrile. The copolymerization was carried out at 58° C. for 4 hours. The yield of dry copolymer was 0.3 g.

Analysis: 1.5% F, which corresponds to a ketone imine to acrylonitrile mole ratio of 1:118.

The preparation of N-phenylpentafluoroacetone imine used in this experiment was carried out according to the scheme

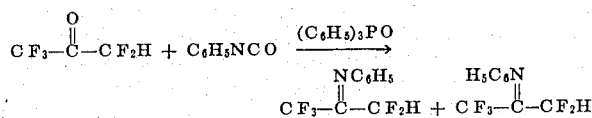

A mixture of 46.5 g. (0.39 mole) of phenylisocyanate, 10 g. (0.03 mole) of triphenylphosphine oxide and 60 g. (0.41 mole) of pentafluoroacetone was heated in a 200 ml. Hastelloy bomb at 200°C. for 16 hours. The mixture was filtered and distilled to give 55.6 g. (62% yield) of N-phenylpentafluoroacetone imine boiling at 52° C./7.5 mm.

An alternative preparation was effected via the reaction

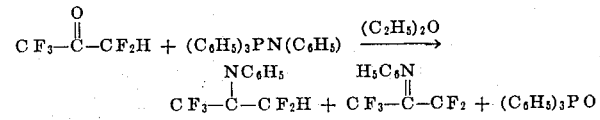

Pentafluoroacetone, 20 g. (0.13 mole), was bubbled into a suspension of 59.6 g. (0.16 mole) of triphenylphosphinephenyl-imine in 150 ml. of ether. The mixture was stirred for 30 minutes and then refluxed for 1.5 hours. This mixture was filtered and distilled to give 26.2 g. (87 percent yield) of N-phenylpentafluoroacetone imine boiling at 44.5° C./5 mm.

The $F^{19}$ nmr spectrum showed a doublet (J = 51.5) split to quartets (J = 7) centered at 121 ppm, a triplet (J = 7) at 63.7 ppm and a triplet (J = 3.5) split to doublets (J = 0.5) centered at 69.2 ppm. The $H^1$ nmr spectrum showed a triplet (J = 26) at 4.50$\tau$ and a doublet (J = 14) split to doublets (J = 3.5) centered at 3.52$\tau$.

Anal. Calcd. for $C_9H_6F_5N$:
C, 48.4; H, 2.7; F, 42.6; N, 6.3
Found: C, 48.6; H, 2.9; F, 42.7; N, 6.3.

EXAMPLE 11

Copolymerization of Chloropentafluoroacetone Imine and Acrylonitrile

The procedure of Example 6 was followed with 10 mg. of azobisisobutyronitrile, 1.8 g. of chloropentafluoroacetone imine and 0.5 g. of acrylonitrile. Copolymerization was carried out at 58° C. for 4 hours. The yield of dry copolymer was 0.3 g.

Analysis: 1.4% F, which corresponds to a mole ratio of ketone imine of 1:125.

The preparation of chloropentafluoroacetone imine used in this experiment was carried out according to the scheme

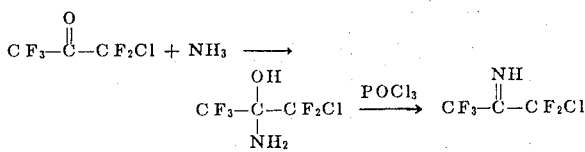

Twenty ml. of ammonia was bubbled into a solution of 40 ml. of chloropentafluoroacetone in 100 ml. of pentane. The mixture was filtered to give 60 g. of 1-chloro-1,1,3,3,3-pentafluoro-2-hydroxy-2-propylamine melting at 70°–72°C. Phosphorous oxychloride, 45 g., was added dropwise to a solution of 69 g. of the hydroxyamine in 150 ml. of pyridine. The volatile products were removed in a dry ice/acetone trap as they formed. After the addition, the reaction mixture was heated strongly to remove additional volatile products. The products boiling below 100° C. were distilled to give 46.5 g. (89% yield) of chloropentafluoroacetone imine boiling at 47° C.

EXAMPLE 12

Copolymerization of N-methylhexafluoroacetone Imine and Ethylene

A pressure vessel was charged with 11 g. of N-methyl-hexafluoroacetone imine, $(CF_3)_2C=NCH_3$, prepared according to U.S. Patent 3,226,439, 50 ml. of benzene, and 0.05 g. of di-t-butyl peroxide. The vessel was cooled in a dry ice/acetone bath and evacuated. Ethylene was added to a pressure of 460 atm. The reaction mixture was maintained at 135° C. and 460 atm. for 6 hours. The resulting polymer (8 g.) was recrystalized from hot benzene.

Analysis: 5.2% F, which corresponds to a 1:71 mole ratio of N-methylhexafluoroacetone imine to ethylene. N, 0.43%. Inherent viscosity in tetralin at 125° C., 0.26.

A 5-mil film pressed at 120° C. was flexible and had strong C-E absorption band at 1,220 $cm^{-1}$.

EXAMPLE 13

Copolymerization of N-Hexafluoroisobutyryl hexafluoroacetone Imine and Methyl Trifluorovinyl Ether A Pyrex polymer tube was charged with 6.25 g. of N-hexafluoroisobutyryl hexafluoroacetone imine prepared as in Examples 6 and 7, and 0.1 g. of azobisisobutyronitrile. The tube was evacuated, and 2.2 ml. (2.3 g., 0.02 mole) of chilled methyl trifluorovinyl ether (b.p. 11°–12° C.) at 0° C. was introduced by pouring it into the chilled polymer tube. The contents were frozen in liquid nitrogen and degassed by two thaw-freeze cycles, and the tube was sealed under a 0.2 mm. vacuum.

The reaction mixture was then heated at 65° C. for 4 hours to give a pale yellow waxy solid along with some sublimed unchanged acyl imine.

The entire mixture was taken up in acetone and the polymer was precipitated by dropwise addition to hexane. The polymer was dried under vacuum at 120° C. to remove solvent and traces of imine monomer that coprecipitated. Anal. Calcd. for a 1:15 mole ratio of N-hexafluoroisobutyryl-hexafluoroacetone imine to vinyl ether: C, 30.9; H, 2,3; N, 0.7 Found: C, 30.7; H, 2.4; N, 0.6 0.7. Inherent viscosity (0.1% in acetone at 25° C.), 0.12.

EXAMPLE 14

Copolymerization of N-phenylhexafluoroacetone Imine and Styrene

A Pyrex polymer tube was charged with 3 ml. of styrene monomer, 6 ml. of N-phenylhexafluoroacetone imine (prepared by the method of I. L. Knunyants, Bull. Acad. Sci. S.S.S.R., Division of Chemical Sci. 1965, 435; 1962, 633) and 0.02 g. of azobisisobutyronitrile. The tube contents were frozen, degassed and sealed under vacuum to give a miscible mixture. The contents were heated at 65° C. for 6 hours. A layer of viscous polymer covered the mobile liquid lower layer. The contents were then dissolved in benzene. The resulting solution was dropped into methanol to precipitate the polymer, which was vacuum-dried at 100° C. to give 0.65 g. of pale yellow solid.

Films could be pressed at 110° C. to give clear, pale yellow films. Anal. Calcd. For 1:30 mole ratio copolymer of N-phenylhexafluoroacetone imine to styrene: F, 3.4; N, 0.4

Found: F, 2.9; N, 0.4 0.4. Inherent viscosity (0.1% in benzene at 25° C.), 0.39.

EXAMPLE 15

Copolymerization of Hexafluoroacetone Imine, Ethylene and Tetrafluoroethylene

A. A stainless-steel shaker tube was charged with 50 g. of 1,1,2-trichloro-1,2,2-trifluoroethane and 0.5 g. of perfluoropropionyl peroxide. The reactor was closed, cooled in dry ice/acetone and evacuated to a few mm pressure. The following reactants were sucked into the reactor: 5 g. of hexafluoroacetoneimine, 13 g. of ethylene, and 50 g. of tetrafluoroethylene. The reactor and contents were agitated and heated as follows:

| 40°C. | 440 psi | 3 hours |
| 50°C. | 500 psi | 3 hours |
| 60°C. | 575–525 psi | 3 hours |

The reactor was cooled and bled to atmospheric pressure, and the polymeric product was recovered by filtration. There was thus obtained 4.3 g. of ethylene/tetrafluoroethylene/hexafluoroacetoneimine terpolymer having essentially the molar composition 38.8/57.6/3.5.
Anal. Found: F, 59.0%; N, 0.56%; 0.65%.

Infrared analysis showed N-H bands at 2.72 $\mu$ (sharp) and 2.85-2.95 $\mu$ (broad).

The melting point by differential thermal analysis was found to be 259° C.

In comparison, ethylene/tetrafluoroethylene, prepared essentially as above, has a differential thermal analysis melting point of about 277° C.

The polymer was pressed to a film at 250° C.

B. The procedure of A was essentially repeated with the following mixture: 50 g. of 1,1,2-trichloro-1,2,2-trifluoroethane, 0.5 g. of perfluoropropionyl peroxide, 2.0 g. of hexafluoroacetoneimine, 13 g. of ethylene, and 50 g. of tetrafluoroethylene.

The above mixture was heated at 40° C. and 440–450 psi pressure for 3 hours. The polymeric product, isolated as in Example 15, amounted to 8.9 g. of ethylene/tetrafluoroethylene/ hexafluoroacetoneimine having essentially the molar composition 55.6/43.4/0.98.

This polymer was pressed into a self-supporting film at 220° C.

Anal. Found: F, 59.0%; N, 0.26%, 0.25%.

The infrared spectrum of this polymer showed a sharp N-H band at 2.7 $\mu$ and broad bands at 2.8-2.9 $\mu$. The melting point by differential thermal analysis was 277° C.

EXAMPLE 16

Copolymerization of N-Methylhexafluoroacetone Imine, Ethylene and Chlorotrifluoroethylene Example 15 was essentially repeated with the following: 50 g. of 1,1,2-trichloro-1,2,2-trifluoroethylene, 0.2 g. of perfluoropropionyl peroxide, 2.0 g. of N-methylhexafluoroacetoneimine, 13 g. of ethylene and 58 g. of chlorotrifluoroethylene.

The mixture, on being heated to 38° C., reacted exothermically and the temperature surged to 93° C. The pressure at 38° C. was about 290 psi and at 93° C., 355 psi. It returned to 215 psi after the temperature was reduced to 38° C. A yield of 37 g. of a terpolymer containing about 1 percent of N-methylhexafluoroacetoneimine was obtained.

Anal. Found: N, 0.08%; m.p. by differential thermal analysis, 240° C.

In comparison, ethylene/chlorotrifluoroethylene copolymer, when prepared at 0° C. melts at about 235°–230° C.

The polymer was pressed at 240° C. to form a strong transparent film tough enough to withstand creasing, bending back through 180° and recreasing.

EXAMPLE 17

Copolymerization of N-Methylhexafluoroacetone Imine, Ethylene and Tetrafluoroethylene A. Example 15 was essentially repeated with the following: 50 g. of 1,1,2-trichloro-1,2,2-trifluoroethylene, 0.5 g. of perfluoropropionyl peroxide, 5.0 g. of N-methylhexafluoroacetoneimine, 13 g. of ethylene, and 50 g. of tetrafluoroethylene.

The mixture was heated at 35°–38° C. for 5 hours, during which time the pressure dropped from 430 to 419 psi. The polymeric product amounted to 14 g. of a polymer containing 3.7% of N-methylhexafluoroacetoneimine. The polymer was pressed to a strong film tough as that of Example 16.

Anal. Found: N, 0.29%, m.p. by differential thermal analysis, 280° C.

B. Example 17A was essentially repeated with 50 5. of 1,1,2-trichloro-1,2,2-trifluoroethane, 0.2 g. of perfluoropropionyl peroxide, 1 g. of N-methylhexafluoroacetone imine, 13 g. of ethylene and 50 g. of tetrafluoroethylene.

The above mixture was heated to 35° C. at which temperature the reaction became exothermic and the temperature surged to 93° C. A yield of 23 g. of terpolymer was recovered by filtration. The terpolymer melted at 270° C. as determined by differential thermal analysis.

Anal. Found: N, 0.03%.

A 10-mil film pressed from the terpolymer at 260° C./20,000 psi was found to have the following properties:

Tensile at break — 5,734 psi.
Elongation at break — 259%.
Yield strength — 4,040 psi.

As is evident from the examples above, copolymers of this invention exhibit many desirable properties when used as supported or unsupported films. Note, also:

EXAMPLE A

The copolymer of Example 7 was dissolved in ethyl acetate (10 percent solution) and was cast on a glass plate using a doctor knife to spread the solution uniformly. The film formed was pliable and brilliantly clear. It did not support combustion and could be strengthened by drawing in an oil bath set at 100° C. The pleasing appearance and fire resistance of this film demonstrate the usefulness of the products of this invention in practica and decorative packaging of foods and general merchandise. The films are particularly useful where fire resistance is required as for films used in the upholstery and coated fabrics of public vehicles or buildings.

A further use of the copolymers of this invention is as encapsulating agents for the protection of articles during storage or shipping. The articles to be protected may be coated by dipping in or spraying with the polymer solution.

Many of the copolymers of this invention exhibit good adhesion to fabric, metal and wood substrates and consequently find use in the formulation of paints, varnishes and coated fabrics.

Since obvious modifications and equivalents in the invention will be evident to those skilled in the chemical arts, I propose to be bound solely by the appended claims.

I claim:

1. A linear, random copolymer of at least one fluoroketone imine and at least one polymerizable olefinic compound having the structural formula

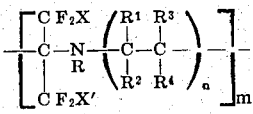

wherein:
X and X', which may be the same or different, are hydrogen, chlorine, fluorine or fluoroalkyl of up to three carbon atoms;
R is hydrogen, hydrocarbyl, fluorohydrocarbyl, carbacyl or fluorohydrocarbacyl of up to ten carbon atoms;
$R^1$, $R^2$, $R^3$ and $R^4$, which may be the same or different, are hydrogen, halogen, hydrocarbyl, cyano, alkoxy, acyl, alkoxy-carbonyl or acyloxy, the number of carbon atoms in any of $R^1$ through $R^4$ being in the range 0 to 10 and the total number of carbon atoms in $R^1$ through $R^4$ being in the range 0 to 20;
$n$ is an integer in the range 1 to 130; and
$m$ is an integer greater than 4, with the proviso that neither the recurring imine units nor the recurring olefinic units need be the same.

2. A binary copolymer of claim 1 wherein the imine unit is that of hexafluoroacetone imine and the olefinic, ethylene.

3. A binary copolymer of claim 1 wherein the imine unit is that of hexafluoroacetone imine and the olefinic, styrene.

4. A binary copolymer of claim 1 wherein the imine unit is that of N-acetylhexafluoroacetone imine and the olefinic, vinyl acetate.

5. A binary copolymer of claim 1 wherein the imine unit is that of N-acetylhexafluoroacetone imine and the olefinic, acrylonitrile.

6. A binary copolymer of claim 1 wherein the imine unit is that of N-acetylhexafluoroacetone imine and the olefinic, styrene.

7. A binary copolymer of claim 1 wherein the imine unit is that of N-hexafluoroisobutyrylhexafluoroacetone imine and the olefinic, vinyl acetate.

8. A binary copolymer of claim 1 wherein the imine unit is that of N-hexafluoroisobutyrylhexafluoroacetone imine and the olefinic, styrene.

9. A binary copolymer of claim 1 wherein the imine unit is that of N-hexafluoroisobutyrylhexafluoroacetone imine and the olefinic, acrylonitrile.

10. A binary copolymer of claim 1 wherein the imine unit is that of N-hexafluoroisobutyrylhexafluoroacetone imine and the olefinic, methyl trifluorovinyl ether.

11. A binary copolymer of claim 1 in which the imine unit is that of N-benzoylhexafluoroacetone imine and the olefinic, acrylonitrile.

12. A binary copolymer of claim 1 in which the imine unit is that of N-benzoylhexafluoroacetone imine and the olefinic styrene.

13. A binary copolymer of claim 1 in which the imine unit is that of pentafluoroacetone imine and the olefinic, acrylonitrile.

14. A binary copolymer of claim 1 in which the imine unit is that of N-phenylpentafluoroacetone imine and the olefinic, acrylonitrile.

15. A binary copolymer of claim 1 in which the imine unit is that of chloropentafluoroacetone imine and the olefinic, acrylonitrile.

16. A binary copolymer of claim 1 in which the imine unit is that of N-methylhexafluoroacetone imine and the olefinic, ethylene.

17. A binary copolymer of claim 1 in which the imine unit is that of N-phenylhexafluoroacetone imine and the olefinic, styrene.

18. A terpolymer of claim 1 in which the imine unit is that of hexafluoroacetone imine and the olefinic units are those of ethylene and tetrafluoroethylene.

19. A terpolymer of claim 1 in which the imine unit is that of N-methylhexafluoroacetone imine and the ethylenic units are those of ethylene and chlorotrifluoroethylene.

20. A terpolymer of claim 1 in which the imine unit is that of N-methylhexafluoroacetone imine and the ethylenic units are those of ethylene and tetrafluoroethylene.

21. A film made from a copolymer of claim 1.
22. A film made from the binary copolymer of claim 2.
23. A film made from the terpolymer of claim 18.
24. A film made from the terpolymer of claim 19.
25. A film made from the terpolymer of claim 20.

* * * * *